United States Patent [19]

Curley et al.

[11] Patent Number: 5,675,771

[45] Date of Patent: Oct. 7, 1997

[54] MECHANISM FOR ENABLING EMULATION SYSTEM USERS TO DIRECTLY INVOKE A NUMBER OF HOST SYSTEM FACILITIES FOR EXECUTING HOST PROCEDURES EITHER SYNCHRONOUSLY OR ASYNCHRONOUSLY IN A SECURE MANNER THROUGH AUTOMATICALLY CREATED SHELL MECHANISMS

[75] Inventors: John L. Curley, North Andover; Thomas S. Hirsch, Bedford; James W. Stonier, Tewksbury; Kin C. Yu, Burlington, all of Mass.

[73] Assignee: Bull HN Information Systems Inc., Billerica, Mass.

[21] Appl. No.: 311,649

[22] Filed: Sep. 23, 1994

Related U.S. Application Data

[63] Continuation-in-part of Ser. No. 128,456, Sep. 28, 1993.
[51] Int. Cl.$^6$ ...................................... G06F 15/16
[52] U.S. Cl. ........................................................ 395/500
[58] Field of Search ............................ 395/500, 200.06, 395/375

[56] References Cited

U.S. PATENT DOCUMENTS

| | | | |
|---|---|---|---|
| 4,530,052 | 7/1985 | King et al. | 305/200 |
| 4,747,040 | 5/1988 | Banset et al. | 364/200 |
| 4,918,653 | 4/1990 | Johri et al. | 364/900 |
| 5,027,271 | 6/1991 | Curley et al. | 395/200 |
| 5,204,961 | 4/1993 | Barlow | 395/725 |
| 5,228,137 | 7/1993 | Kleinerman et al. | 395/500 |
| 5,230,065 | 7/1993 | Curley et al. | 395/200 |
| 5,361,359 | 11/1994 | Tajalli et al. | 395/700 |
| 5,421,006 | 5/1995 | Jablon et al. | 395/575 |
| 5,452,460 | 9/1995 | Distelberg et al. | 395/700 |
| 5,483,647 | 1/1996 | Yu et al. | 395/500 |

OTHER PUBLICATIONS

GCOS6 HVS6 Plus XC Processor System Basics, published by Bull HN Information Systems Inc., dated Dec. 1991, Order No. LH39–02.

*Primary Examiner*—Vincent N. Trans
*Attorney, Agent, or Firm*—Faith F. Driscoll; John S. Solakian

[57] ABSTRACT

A host data processing system which includes a plurality of input/output devices operates under the control of an enhanced version of the UNIX operating system. The host system includes an emulator which runs as an application process for executing user emulated system (ES) application programs. The emulator includes a number of emulated system executive service components operating in shared memory and an interpreter, an emulator monitor call unit (EMCU) and a number of server facilities operating in the host memory. The ES executive service command handler component is extended to accommodate a number of dual decor commands which invoke host system facilities to execute terminal based commands either synchronously or asynchronously through the automatic creation of host shell mechanisms directly accessible by emulated system users. The server facilities include a network terminal driver (NTD) server for executing emulated system user terminal requests through host system drivers. Additionally, the NTD server includes mechanisms enabling a user to have direct terminal access to host facilities for executing procedures through such shell mechanisms. The mechanisms perform trusted user level validation when each dual decor command is issued and the shell mechanisms use the host access control mechanisms for checking access when the procedure is executed preventing both unauthorized user access and compromises in user data through the improper use of dual decor commands.

7 Claims, 5 Drawing Sheets

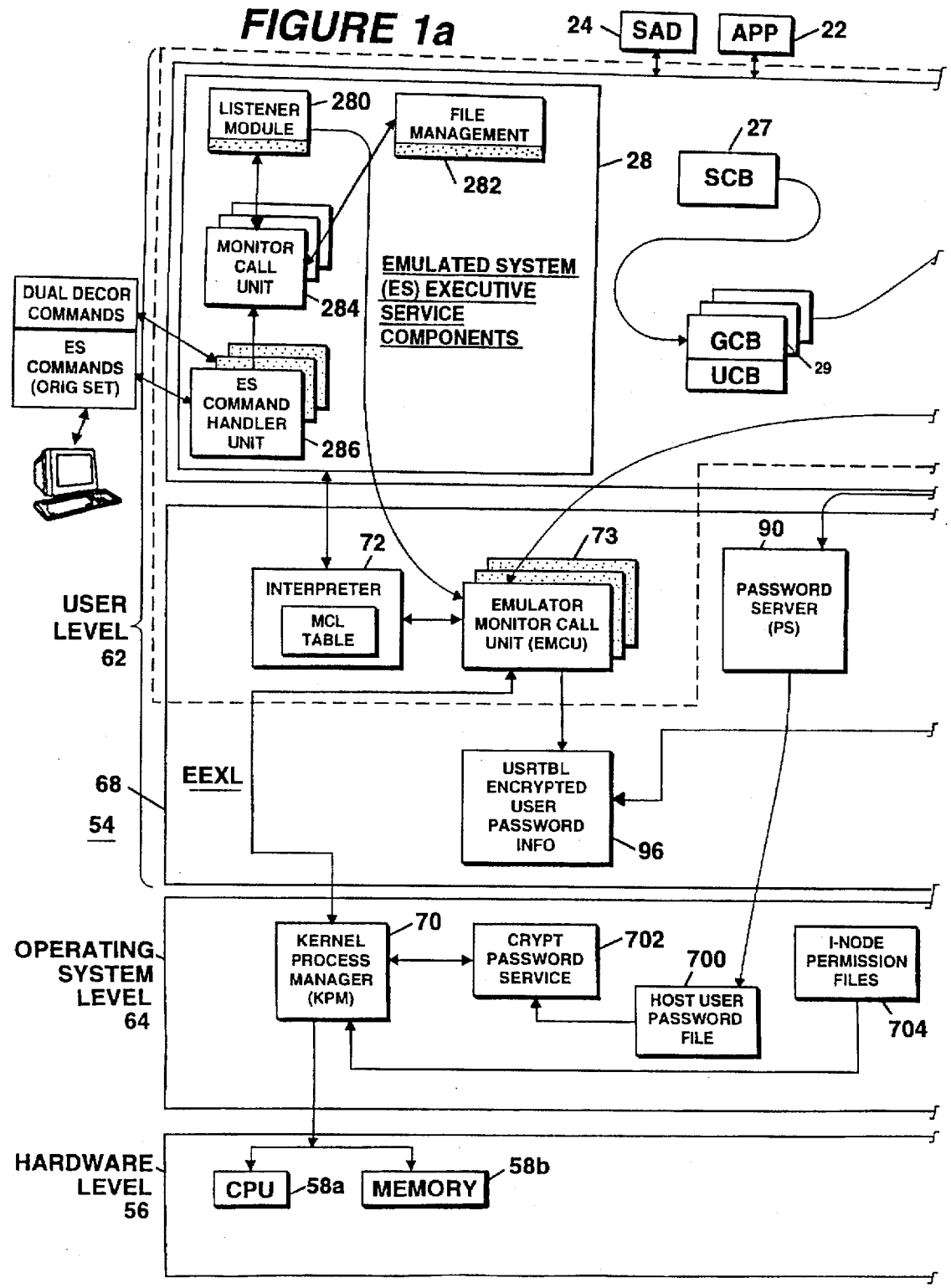

MECHANISM FOR ENABLING EMULATION SYSTEM USERS TO DIRECTLY INVOKE A NUMBER OF HOST SYSTEM FACILITIES FOR EXECUTING HOST PROCEDURES EITHER SYNCHRONOUSLY OR ASYNCHRONOUSLY IN A SECURE MANNER THROUGH AUTOMATICALLY CREATED SHELL MECHANISMS

This is a continuation-in-part of copending patent application Ser. No. 08/128,456, filed on Sep. 28, 1993.

RELATED APPLICATIONS

1. The patent application of Richard S. Bianchi, Thomas S. Hirsch Ron B. Perry entitled, "Dual Decor Capability for a Host System which Runs Emulated Application Programs to Enable Direct Access to Host Facilities for Executing Emulated System Operations," filed on Sep. 23, 1994, bearing Ser. No. 08/311,655 which is assigned to the same assignee as this patent application.

2. The patent application of Thomas S. Hirsch, Richard S. Bianchi, Ron B. Perry and Kenneth J. Buck entitled, "Copy File Mechanism for Transferring Files Between a Host System and an Emulated System," filed on Sep. 23, 1994, bearing Ser. No. 08/311,652 which issued as U.S. Pat. No. 5,566,326 on Oct. 15, 1996 and which is assigned to the same assignee as this patent application.

3. The patent application of Thomas S. Hirsch, Richard S. Bianchi and Ronald B. Perry entitled, "Mechanism for Linking Together the Files of Emulated and Host System for Access by Emulated System Users," filed on Sep. 23, 1994, bearing Ser. No. 08/311,646 which issued as U.S. Pat. No. 5,572,711 on Nov. 5, 1996 and which is assigned to the same assignee as this patent application.

BACKGROUND OF THE INVENTION

1. Field of Use

The present invention relates to the emulation of one computer system by another computer system, and more particularly to software emulation.

2. Prior Art

With the rapid evolution of higher speed computer systems and new microprocessor chip designs, users now have even a greater need to have their application programs written for a specific computer system run on different computer systems. Moreover, it becomes more important than ever to provide this capability without having to convert or port such application programs. Therefore, a number of vendors have developed both hardware and software approaches to achieve this remit without having to convert or port such application programs.

One prior art system achieves the above by providing the capability of running a plurality of different operating systems. Each operating system is defined as having an interior decor and are utilized by an apparatus which isolates the operating systems and ensures that only the instructions of the currently active operating system are executed. This system is disclosed in U.S. Pat. No. 4,530,052 to James L. King entitled, "Apparatus and Method for a Data Processing Unit Sharing a Plurality of Operating Systems" which issued on Jul. 16, 1985 and is assigned to the assignee named herein. This system has the limitation of not being able to run more than one operating system at a time.

Another prior art system provides a plurality of central processing units each of which tightly couples together and utilizes a different type of operating system. The central processing units in combination with their operating systems operate in a peer relationship in which all systems have access to all system resources. To ensure the integrity of the most secure of the operating systems (i.e., deemed the proprietary operating system), certain mechanisms are included in the system for enforcing certain restrictions on the other less secure operating system (i.e., deemed the non-proprietary operating systems). These restrictions are that a non-proprietary operating system can only access memory allocated by the proprietary operating system and can use only those channels and input/output instructions specifically assigned by the proprietary operating system. Stated differently, mechanisms are provided to prevent the intentional or unintentional use of resources not assigned to the particular central processing unit and operating system combination.

The above system is disclosed in U.S. Pat. Nos. 5,027,271 and 5,230,065 invented by John L. Cudey, et at. entitled, "Apparatus and Method for Alterable Resource Partitioning Enforcement in a Data Processing System Having Central Processing Units using Different Operating Systems" and "Apparatus and Method for a Data Processing System Having a Peer Relationship Among a Plurality of Central Processing Units" which issued on Jun. 25, 1991 and Jul. 20, 1993, respectively, and are assigned to the same assignee as named herein. It will be noted that while this system enables the running of more than one operating system, it requires the use of separate independent central processing units and mechanisms for enforcing the use of only assigned system resources.

When running different operating systems within a system, it becomes desirable to provide a user with the capability of utilizing both systems in an efficient manner. In the prior art system of U.S. Pat. No. 5,230,065, a user is allowed access to both operating systems through a user registration process performed on the proprietary operating system whose results are then transferred to the non-proprietary operating system. When a user has been registered on the proprietary operating system as having access to both systems, the user can issue a special switch command which switches the user's terminal over to the non-proprietary operating system. The switch command allows permanent access (i.e., access until logout from the current session) or temporary access (i.e., access to execute a single command) to the non-proprietary operating system. During this access, the user is able to issue commands while running on the non-proprietary operating system which may for example allow the transfer of data to the other operating system. But, the commands still require the proprietary operating system to process user input/output communication requests giving rise to substantial overhead. For a further description of this system and operations, reference may be made to the publication entitled "GCOS6 HVS6 PLUS XC Processor Systems Basics" published by Bull HN Information Systems Inc., dated December, 1991, order number LH39-02.

While the above prior art arrangement allows a user access to both operating systems, such access takes place at the user level while both operating systems maintain their independent mode of operation. It will be noted that this type of access capability can only be invoked at a high level and still requires user interaction with both operating systems as independent entities. Hence, this capability was in effect built on top of both operating systems, relying heavily on a user's ability to issue the proper sequence of commands to both systems for the execution of the appropriate procedures by each operating system. This arrangement is less efficient since it can be very cumbersome and time consuming to use.

Further, the above prior art arrangement does not provide for stringent security enforcement within both operating systems. That is, the proprietary operating system validates security as to unauthorized access for the entire system through the proprietary operating system's log-in mechanism. As to security for preventing compromises in data, the system includes mechanisms which enable the proprietary operating system to enforce resource restrictions on the non-proprietary system. Thus, this type of approach would not be effective in systems such as that of the present invention in the case where the application programs being run on the proprietary operating system are the application programs which are required to be emulated by the host system.

Furthermore, in the type of prior art proprietary operating system contemplated, information disclosing a substantial part of the organization of the operating system and its associated data structures historically have been made accessible to users. Therefore, it is likely that a knowledgeable user could intentionally or unintentionally alter the operating system data structures defining the user's identity and data access rights to gain access to other user system data files. Since this type of activity would go undetected in the prior art system and therefore unpreventable, this would result in significant compromises in system security.

Accordingly, it is a primary object of the present invention to provide access to host facilities for more efficient execution of application programs being emulated on a host system.

It is another object of the present invention to provide a method and system which enables application programs running in an emulation environment to execute commands using the facilities on a host system in a highly secure manner.

It is still another object of the present invention to provide a method and system for executing application programs running in an emulation environment on a host system which requires no changes to the host system operating system facilities thereby facilitating software enhancement and support.

SUMMARY OF THE INVENTION

The above and other objects of the present invention are achieved in a preferred embodiment of the host data processing system of the present invention which includes a plurality of input/output drivers and operates under the control of a non-proprietary operating system. In the preferred embodiment, the operating system is an enhanced version of the UNIX* operating system known as the AIX operating system developed by IBM Corporation. The host system includes an emulator which runs as an application process for executing user emulated system (ES) application programs which in the preferred embodiment were originally written for use on the DPS6 and DPS6000 family of computers and the GCOS6* and HVS operating systems developed by Bull HN Information Systems Inc.

*UNIX is a registered trademark in the United States and other countries, licensed exclusively through X/Open Company Limited.
**AIX is a registered trademark of International Business Machines Corporation.
***GCOS is a registered trademark of Bull HN Information Systems Inc.

The emulator includes a number of emulated system executive service components (e.g., HVS executive service components) operating in ES and host system shared memory environment and an interpreter, an emulator monitor call unit (EMCU) and a number of server facilities operating in the host system memory environment. The ES executive service command handler component is extended to accommodate a number of terminal based dual decor commands which invoke host system facilities to execute commands (XSH), either synchronously or asynchronously through automatically created host shell mechanisms made directly accessible to authenticated emulated system users. Synchronous operation allows the emulated system user either to log onto the host system for a terminal session or to execute a single command line on the host system and then return to the emulated system. Asynchronous operation allows the emulated system user to launch longer term procedures or operations on the host system and immediately return to the emulated system.

The EMCU includes mechanisms for performing an initial level security validation operation which allows subsequent trusted verification of user identity when dual decor commands or functions are invoked for enabling a user to have direct terminal access to host facilities for executing procedures through the shell mechanisms. The server facilities include a network terminal driver (NTD) server for executing emulated system network terminal requests through host system drivers. The server mechanisms include mechanisms for performing a two-level security validation process for ensuring security relative to preventing unauthorized user access and to host facilities. The first level validates security at the user level and is performed by the NTD driver. The second level validates security at the access level and is automaticaly performed by host access control mechanisms.

More specifically, first, the system validates that the user invoking the operation is in fact a trusted dual decor user. This is carded out by using a unique encrypted description entry of each dual decor user which was previously stored in a user table located in the host memory environment which is inaccessible to ES users. The storing of the entry is done as part of the login procedure in which the ES system, upon verifying that the user is a dual decor user, issues a special monitor call to the EMCU. After validating that the special monitor call came from the proper source, the EMCU verifies that the user is an authorized host system user through the host encrypted password facilities. Once the user identity has been authenticated, the ES system creates the appropriate entry in the user table, which uniquely defines the personality of the user.

In accordance with the present invention, this encrypted description entry has three basic parts or components. These are: the emulated system user id itself which, during the log-in procedure, was established as matching the host user identification; the address of a first emulated system data structure defining the location of the user control block (UCB) and the address of a second emulated system data structure defining the location of the group control block (GCB). The addresses of each set of these data structures are uniquely assigned to a user by the appropriate ES system component during login and only a single copy for any given ES user exists in memory. By maintaining this set of uniquely assigned addresses of these data structures and associating them with the user id, the system of the present invention is now able to determine during the first step of the verification that the user is a trusted dual decor user at the point when a terminal based dual decor command or function is invoked by the user.

The user personality is validated by the EMCU confirming that original description or personality of the user has not been changed. That is, the user has not changed the user id so that it no longer is associated with the same set of UCB and GCB originally assigned addresses indicating that the user's personality has been changed.

If the user description is established as being valid, then the required type of server facilities are created or assigned and necessary logical connections are made between the server facilities and the user's terminal which initiated the dual decor command or operation.

If the system determines that the user invoking the dual decor command or function is not a legitimate dual decor user, the system takes no further action (i.e., does not establish the necessary connections) to execute the dual decor command or function. Thus, there is no way for the user to have the command or function executed thus ensuring security. The user is notified of the violation.

The second step is performed by the server facilities at the file or directory level at file access time (open) using the built-in file protection mechanisms of the host system to compare the user permissions within the group to which the user belongs against the permissions associated with the data files to be accessed to verify that they are correct. If correct, the requested operation is allowed to proceed. If the user is determined as not having the required level of permission, the server facilities do not perform the requested operation and the user is notified of the access security violation.

In the preferred embodiment, the NTD server performs the first step of the security validation operation through the XSH server created to establish the required logical connections between the user terminal and host facility specified by the user to execute commands. The access check step is performed at a lower level by a shell mechanism created by the XSH server to perform the particular dual decor operation. Access control checking is done at a lower level by the host access control mechanisms initiated by user commands.

In the preferred embodiment, the terminal based dual decor commands include a shell command (XSH), an XMAN command, XTELNET command, XFTP command and XTPAD command. These commands can be used to access specific host shell facilities. For example, the XSH shell command is used to execute host shell commands. The XMAN command is used to access host on-line manual pages facility. The XTELNET command is used to access the host TELNET network facility. The XFTP command is used to access FTP facilities and the XTPAD command is used to access network services facilities. Each of these commands use a common server.

BRIEF DESCRIPTION OF THE DRAWINGS

FIGS. 1a and 1b illustrate in block diagram form a host system which incorporates the dual decor shell command according to the teachings of the present invention.

DESCRIPTION OF THE PREFERRED EMBODIMENT

Figure 1B:
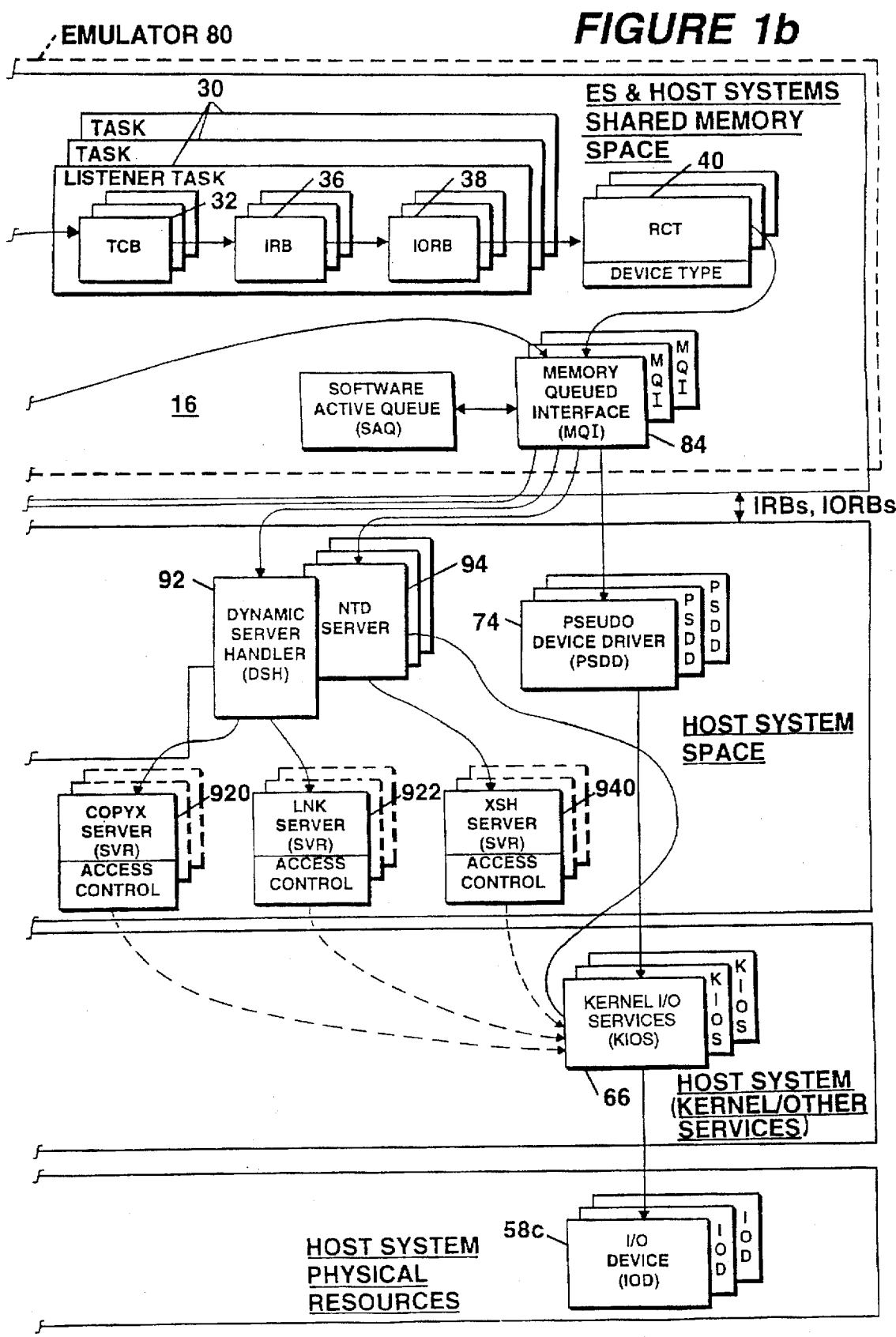

FIGS. 1a and 1b illustrate in block diagram form; a host system 54 which incorporates the dual decor components of the present invention. As shown, the system 54 includes a hardware platform 56 which contains the hardware elements such as a central processing unit 58a, a main memory 58b and a number of input/output peripheral/communications drivers including a local area network for connecting system 54 to other processing systems via standard communication network facilities.

The central processing unit (CPU) represented by block 58a is a reduced instruction set (RISC) based processing unit which takes the form of the RS6000 microprocessor manufactured by IBM corporation. The hardware platform 56 may also take the form of the DPX/20 system marketed by Bull HN Information Systems Inc.

As seen from FIG. 1a, hardware platform including processing unit 58a operates under the control of an enhanced version of the UNIX operating system such as the AIX operating system. Portions of physical memory represented by MEM block 58b are illustrated in terms of the layered construction. As shown, memory is divided into two basic levels, a user level and a kernel level. The user level is divided into emulated system (ES) and host shared memory space and host or native memory space. The shared memory space contains the ES executive level 16 which includes a plurality of executive program tasks 30 spawned by ES executive services components of block 28 for executing ES application programs 22 and system administrator programs 24.

In the emulated system, each task 30 utilizes a plurality of data control structures, such as a task control block (TCB) structure 32, an indirect request block (IRB) structure 36, an input/output request block (IORB) structure 38 and a resource control table (RCT) structure 40. The task control block (TCB) structure 32 contains information pertaining to the state of execution of the associated task as well as pointers to interrupt save areas for storing hardware parameters related to the task. The indirect request block (IRB) structure 36 contains information defining the operation requested by an associated task and includes pointers identifying the task and its associated task control block (TCB) and a pointer to the associated IORB structure.

The input/output request block (IORB) structure 38 is used as the standard means of requesting a physical I/O service. It contains information such as a logical resource number (LRN) that identifies the I/O driver being addressed as well as the location and size of the buffer to be used for the transfer and the specific function (operation) requested. The resource control table (RCT) structure 40 contains information describing the resources, such as its characteristics or information regarding the tasks or requests being executed by a corresponding resource as well as pointers to its associated task control block (TCB) structure.

Additionally, two other structures depicted in FIG. 1a utilized by the present invention are a group control block (GCB) structure and a user control block structure of block 29. The GCB structure contains information required to define and control the operations of a specific task group which defines a named set of one or more tasks with a common set of resources within which a user and system function must operate. Each group has a two character name (e.g., $L, $S) by which the group is uniquely known to the system. The GCB structure includes information identifying the lead task whose execution spawns all other tasks required for executing group programs. As indicated, the GCB structure includes a number of user control blocks (UCB), each of which contains information defining the user's personality such as user node identification, user group id within a node, user task id within group, user person id and pointer information to directories to which the user has access.

As shown, the emulated system utilizes a further data structure corresponding to system control block (SCB) structure 27. This data structure is created at system startup and contains information defining system resources and pointers to the different task groups established by the system represented by a corresponding number of group control blocks in the system. For further information regarding such structures and their relationships to each other, reference may be made to U.S. Pat. No. 5,111,384 and the publication entitled "HVS PLUS Systems Concepts" published by Bull HN Information Systems Inc., Order No. HE03-01.

As indicated in FIG. 1b, the shared memory space further includes a memory queued interface (MQI) represented by block 84 which provides a form of interprocess communication mechanism and a software active queue (SAQ) of block 88. SAQ block 88 represents a data structure used to provide the path by which the results of the operations performed by the kernel level components are passed back or returned by the host processes to the requesting emulated system user level tasks 30 being executed. Thus, it can be viewed as functioning as an output stage of MQI 84. This data structure is similar to data structures which are used by the emulated system operating system.

MQI block 84 is a semaphore data structure which takes the form of a single linked list controlled by semaphores through a set of routines which are executed by the various host processes operating within different levels or layers that want to communicate with each other. Its routines are used to manage queues within the pseudo drivers 74 and the software active queue 88.

Executive Services Components 28

As seen in FIG. 1a, the executive services components 28 of executive layer 16 includes a plurality of components or facilities which are equivalent to those facilities normally included in emulated system. The facilities utilized by the present invention include a listener module 280, a file management facility 282, a monitor call unit 284 and a ES command handler unit 286 which are arranged as shown. The listener module 280 is responsible for monitoring the operations of terminals configured for login and for initiating user processes in response to user commands. As indicated in FIGS. 1a and 1b, listener module 280 runs as a task 30 with its own set of unique data structures.

As described herein, the listener module 280 is able to consult a profiles file containing user specific registration information such as user id, login id and password requirements tabulated by the system administrator for all registered users. The listener module 280 checks the user profile when verifying the privileges and/or restrictions given to each user. The file management facility 282 includes the conventional shared data structure and set of routines normally provided to perform functions that access such data structure to control the synchronization of concurrent processes or tasks in addition to performing various system services or functions. That is, the facility responds to system service monitor calls identifying the types of services requested (e.g. creating or deleting files, reading or writing records or blocks in files) which result in the specified system services being executed by the emulated system on behalf of executing user application programs.

The monitor call unit 284 receives monitor calls from the interpreter component 72 which are in turn to be executed interpretively using the ES executive service components of block 28. The command handler unit 286 contains the routines that respond to user commands entered via a terminal or program. In response to such commands, the unit 286 routines invoke the appropriate processes for executing such commands. As discussed herein in greater detail, each of these components (e.g. shaded boxes in FIG. 1a) have been augmented or extended to incorporate different dual decor aspects or features according to the teachings of the present invention.

Emulator Level Layer 68

As indicated in FIG. 1a, the next layer within the user level is the emulator executive level 68. This level includes certain components present in the emulated system which have been transformed into new mechanisms which appear to the remaining unchanged components to operate as the original unchanged components of the emulated system. At the same time, these new mechanisms appear to the components of the kernel level 64 as native components with which the host system is accustomed to operate. As shown, the components include the interpreter 72, an emulator monitor call unit (EMCU) 73, a plurality of servers 90, through 940, and a plurality of pseudo driver drivers (PSDD) 74 arranged as shown.

Additionally, level 68 includes a data structure in the form of user table 96 which contains entries which uniquely define the personalities of the different dual decor users. This table is maintained to be able to determine that a given user has successfully gone through the login procedure. In accordance with the present invention, each such encrypted user description entry has three basic parts or components. These are: the emulated system user id itself which during the log-in procedure was previously established as matching the host user identification; the address of a first emulated system data structure defining the location of the user control block (UCB) and the address of a second emulated system data structure defining the location of the user group control block (GCB).

The interpreter 72 successively fetches the instructions of an emulated system application program, categorizes each instruction and executes it interpretively through sequences of RISC instructions which allows CPU 58a, MEM 58b and other elements of host system 54 to emulate the operations of corresponding elements of the emulated system. The interpreter 72 includes a monitor call (MCL) table containing information for each possible monitor call which it utilizes to determine whether to trap or send an ES monitor call to the ES executive services components 28 for execution of the instruction or to make an emulator call to EMCU 73 for execution of the instruction through the services of an appropriate C language routine (server). The EMCU 73 is responsible for acquiring from the host system 54, the necessary memory and other resources, for initializing the emulated system data structures and invoking interpreter 72 and the various server processes. Both the interpreter 72 and EMCU 73 run as host processes but not as root.

As viewed by the host system, the ES service components 28 and tasks 30 being executed on behalf of the application programs, the interpreter 72 and EMCU 73 are executed in the system 54 of FIG. 1 as a single process 80 wherein such process corresponds to one or more user processes as defined by the conventions of the host operating system being run on host system 54. Thus, it is possible to have multiple instances of the emulated system concurrently emulated on host system 54.

The password server 90, the dynamic server handler (DSH) 92 and the network terminal driver (NTD) servers 94 are created by EMCU 73 during initialization. Each of the servers 90, 92 and 94 communicate with emulated system processes through MQI 84 as indicated. The lower level group of servers 920, 922 and 940 are dynamically created by their respective higher level servers 92 and 94 for carrying dual decor operations according to the present invention. All of the servers operate as root and therefore have super user privileges with access to any file within the host system 54. The NTD servers 94 are designed to contain the functionality required to handle different types of terminals such as the network terminal driver described in U.S. Pat. No. 4,951,245 which issued on Aug. 21, 1990.

As described in detail herein, both the servers 92 and 94 include mechanisms specifically designed for validating security at the user level in conjunction with the execution of dual decor commands and functions. As shown in FIG. 1b, the lower level group of servers 920, 922 and 940, each include access control mechanisms used to validate security at the file level. In the case of server 940, host access control mechanisms are used.

As indicated in FIGS. 1a and 1b, the EMCU 73, dynamic server handler 92 and NTD server 94, each have access to a data structure in the form of a user table (USRTBL) 96 which has been located in host space so as to be inaccessible to ES user application programs. As described herein in greater detail, the table 96 contains encrypted user descriptor information which is used for validating a user's identity according to the teachings of the present invention. The encryption ensures security in the event of a memory dump.

As indicated in FIG. 1b, the emulator executive level 68 further includes a plurality of pseudo drivers (PSDD) 74 for each input/output driver or type of input/output driver which is required to be emulated by host system 54. For example, the pseudo driver drivers 74 will include PSDDs for terminals, disk drivers, tape drivers, displays and for certain communication drivers.

For a more detailed discussion of other aspects of the SAQ 88, MQI block 84, PSDD 74 and other emulator components, reference may be made to the parent patent application.

Operating System/Kernel Level

The operating system/kernel level 64 includes the standard mechanisms and components normally included within the host operating system. As shown, level 64 includes a kernel process manager component 70, a host user password file 700, a host crypt password service facility 702, Inode permission files storage 704 and a number of host kernel I/O services (KIOS) processes 66 for each pseudo driver (PSDD) 74 which is to be emulated by the host system and for each of the servers 920 through 940 assigned to execute dual decor commands and functions. Since the components of the kernel level 64 are well known, they are only briefly described herein. The host user password file 700 is used for storing information identifying registered host users. This file is updated and maintained by the host operating system kernel process manager 70. A part of the information store in the password file 700 is the user encrypted password generated using the one way crypt password service facility 702 invoked by the kernel process manager 70.

The Inode permission files storage contains entries listing the attributes and disk addresses of each file in the system. Each Inode entry contains information about the type, size, times, ownership and disk blocks in each inode. The directory structure in the host system uses entries, each of which contains just a file name and its Inode number. The attributes of an entry include references to access control lists (ACLs) defining the file's base and any extended permissions. The base permissions correspond to the traditional file access modes (i.e., read, write and execute/search) assigned to a file owner, file group and other users. The extended permissions designate how the base permissions have been modified in terms of permitting, denying or specifying access modes for specific individuals, groups, or user and group combinations designated by user and group ids. For the purpose of the present invention, this arrangement can be considered conventional in design.

Additionally, in the preferred embodiment of host system 54, level 64 is assumed to contain the standard utility programs, shell, editors, compilers, etc. and libraries (e.g., I/O libraries, open, close) which are accessed in the host user mode. For further information regarding the use of such arrangements, reference may be made to publications of the IBM Corporation describing the AIX operating system.

DESCRIPTION OF OPERATION

With reference to the flow chart of FIG. 2, the dual decor shell command incorporated into system 54 according to the teachings of the present invention will now be described. As diagrammatically illustrated in FIG. 1a, dual decor commands encompass new commands and extensions to existing commands of the emulated system. The dual decor shell command and the other similar commands of this type defined as terminal based commands can be viewed as new commands which allow users to directly execute host commands interactively or noninteractively from an emulated system user terminal connected through NTD server 94 and host driver facilities.

The format of this command line is: XSH ["Xcommand [&]"].

The term XSH corresponds to a new command code which is followed by the indicated arguments. The "Xcommand[&]" argument is used to specify the host command that the user wants to execute. The command is contained within quotation marks to ensure that the argument characters are properly transmitted to the host system 54. The ampersand (&) symbol is used to designate the noninteractive mode of operation wherein the shell executes the command line in the background.

When the XSH command is being executed interactively, the user is given direct access to host system facilities for a terminal session or to execute a single host command line and return to the emulated system when the command is completed. The output from the host command(s) is displayed on the user's terminal. In the case of asynchronous operation, an emulated system user can execute host commands and procedures in the background. Control of the user terminal returns to the emulated system without having to wait for the completion of command execution. The output from an asynchronously executed command is appended to the "nohup.out" file in the user's home directory on the host system. Examples of synchronous and asynchronous XSH commands are given in Appendix A.

Also, the arrangement of the present invention also processes similar types of commands to invoke host facilities. These commands include an XTELNET command for invoking the outbound Telnet facilities of host system 54 which include a host utility that allows an emulated system user access to a remote system, an XTPAD command for invoking a host terminal packet assembler/disassembler (TPAD) facility for allowing an emulated system user access to an X.25 network and an XMAN command for accessing host system on-line documentation which also includes special manual pages relevant to the ES emulator allowing an emulated system user to view such documentation. These commands and their formats are described in Appendix B.

The XSH command of the present invention can be viewed as being representative of all of the terminal based dual decor commands. The XSH command can be used as a mechanism through which emulated system users can augment their emulated system applications with host based applications. The user may want to add or replace certain applications. For example, a user may want to use a specific host package in lieu of an existing emulated system application package which is invoked through an emulated system user menu selection operation. With a small change, the menu selection can be made to invoke an XSH command which launches the host application package. When the application completes the operation, the system returns to the emulated system user menu.

The operation of the mechanism of the present invention will now be described in greater detail. It will be assumed by way of example that a properly logged on user enters a command line containing an XSH command either via a terminal or through an execution command file. Since login has already taken place, the appropriate encrypted entry will have been stored in user table 96 and hence is available for use by the XSH command during execution as described herein. The user entered XSH command invokes a command processor (not shown) included within block 28. The command processor is a system software component that reads each command line entered by the user through a terminal and then passes it to the appropriate command handler within block 286 for execution.

Since this is a new command, an XSH command handler has been added and receives the user XSH command line arguments via a pointer from the command processor. The XSH command handler retrieves the arguments. Any errors in the command line is reported to the user and the processing of the XSH command is terminated. More specifically, the XSH command handler determines the connection status to verify that the user terminal was connected to the ES system via Listener.

The XSH command handler as part of the RQIO monitor call provides the information included in the different data structures normally utilized by the emulated system (e.g., IORB, parameter control block (PMCB), logical resource block (LRB), etc.) Next, the XSH command handler issues a request I/O (RQIO) monitor call to EMCU 73 with an IORB structure containing a unique function code specifying a "switch to host" operation and the LRN value of NTD server 94. The IORB structure is shown in the Appendix. It will be noted of interest to the present invention is that the XSH command handler includes a special NTD function code designating that an XSH operation is to be performed (i.e., the user is to be logically connected to the host system) within an extension portion of the IORB utilized by the NTD server 94. Also, the XSH command handler includes information designating which type (option) of XSH command is to be executed. That is, while each terminal based dual decor command has its own command handler, each command handler includes a common section which performs the same series of operations in setting up or initializing the IORB structure to contain the necessary command information to be processed by XSH server 940 as described herein. More specifically, as seen in Appendix A, the IORB includes a command type field for storing a code defining the facility to be invoked. The codes f, m, p, r and t, respectively, invoke ftp, manpages, tpad, shell and Telenet facilities included within host system 54.

The EMCU 73, in response to the RQIO monitor call, directs the request to NTD server 94 by enqueuing the IORB onto the MQI queue for the server 94 (block 202). As indicated in FIG. 2, the NTD server 94 opens a previously allocated host message queue structure for reporting errors (block 204). The preferred embodiment utilizes a single message queue for passing messages via interprocess communications between all XSH server processes for more efficient error response processing. The messages from different servers are distributed by user id and session number. Also, the NTD server 94 performs a series of standard operations on the IORB structure for validating the request relative to current driver mode defined by driver profile information with the information contained in the IORB. The NTD server then deactivates the connection of the user terminal with STDIN, but keeping the connections with STDOUT and STDERR.

Figure 2A:
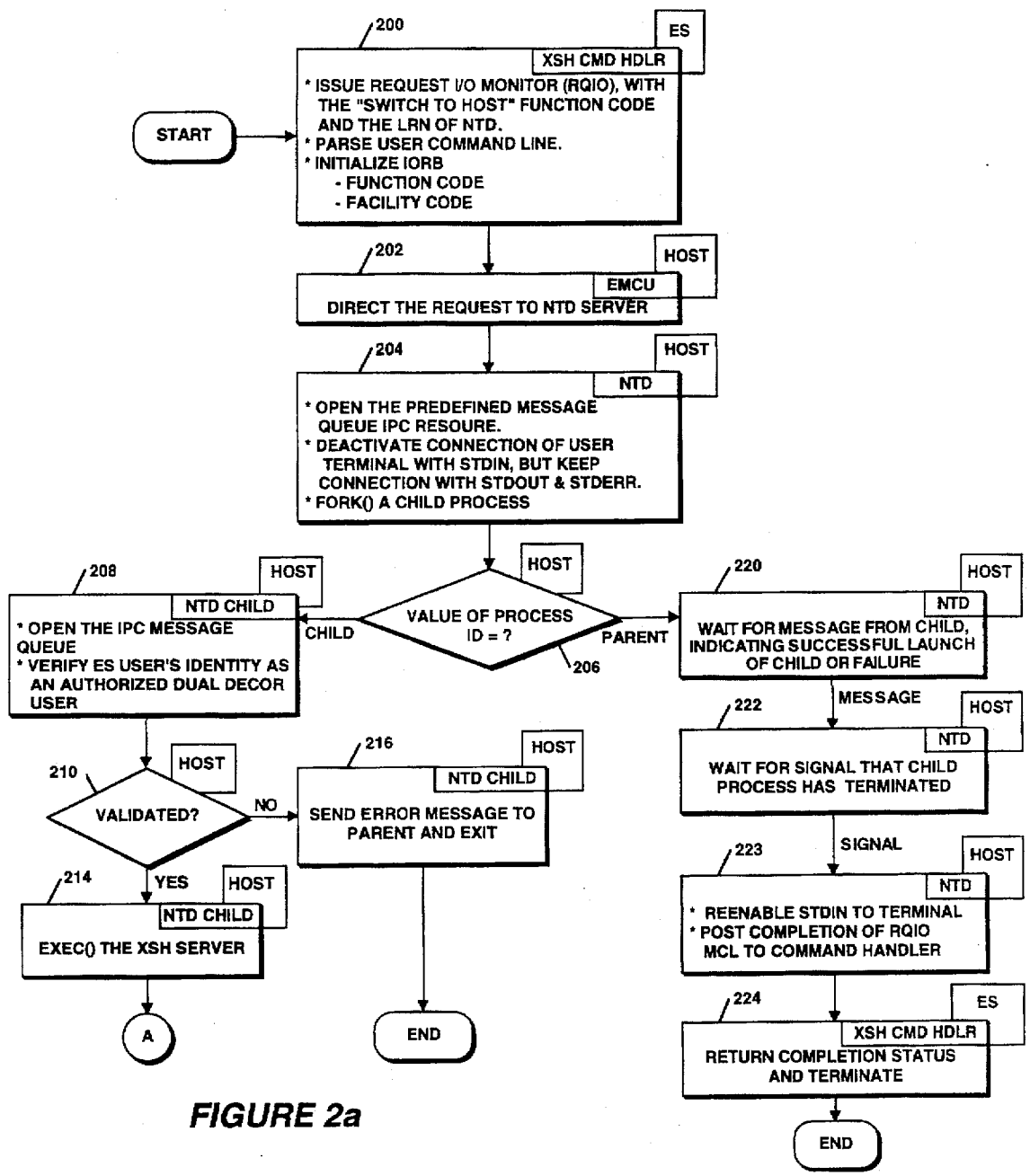
FIGS. 2a through 2c are flow charts used in describing the operation of the present invention.

Next, the NTD server 94 spawns a child program to execute the XSH server 940 operating in the host environment. This is done by issuing "fork" and "exec" system calls to kernel manager 70. Different sequence of operations are performed by both the NTD child and parent processes. In FIG. 2a as in other Figures, these sequences are differentiated by process identifier (PID) value. As described herein, the child process XSH server 940 executes the switch operation which switches or logically connects the user terminal to the host system 54. The user terminal was connected to the emulated system when the user logged onto the emulated system during the previously mentioned logon procedure (i.e., connected to operate in conjunction with host driver facilities through NTD server 94).

The XSH command logically connects the user's physical terminal directly to host system 54 without still having to go through another system operating system as in the prior art. As described herein, this is accomplished by an NTD server 94 creating the XSH server 940 which logically connects the user to the required host system shell interface and routes data between the shell terminal driver and the shell.

As indicated in FIG. 2a, before the XSH server is "execed" by the NTD server 94, the NTD server 94 through its child process first opens the IPC message queue and next verifies that the ES user's identity is that of an authorized dual decor user (block 208). In accordance with the present invention, this validation is performed by invoking a common user level access routine (get user) which compares the current user's personality against the entry for that user stored in the user table 96 during the login procedure as discussed above. The current user id, UCB and GCB addresses are obtained through the IRB address pointer contained in the IORB structure.

The user level access routine verifies if the user description is identical to that stored in user table 96 indicating that the user is a trusted dual decor user. If the user personality is validated, then the NTD server 94 through the child process execs the XSH server by issuing the exec() system call to kernel manager 70 (blocks 21, 214). if the user personality cannot be validated, then NTD server 94 child process sends an error message via the message queue to the NTD server parent process and then exits (block 216).

As indicated in FIG. 2a, the NTD server parent process waits for a message from the XSH server child process indicating whether or not the child process was successfully launched (block 220). Whether through failure or through normal termination, the NTD server 94 waits for a signal indicating that the child process has been terminated (block 222). In response to the signal, the NTD server 94 reenables the connection of the user terminal to STDIN and posts the completion of the RQIO request to the XSH command handler (block 224). The XSH command handler returns completion status and terminates its operation.

Figure 2B:
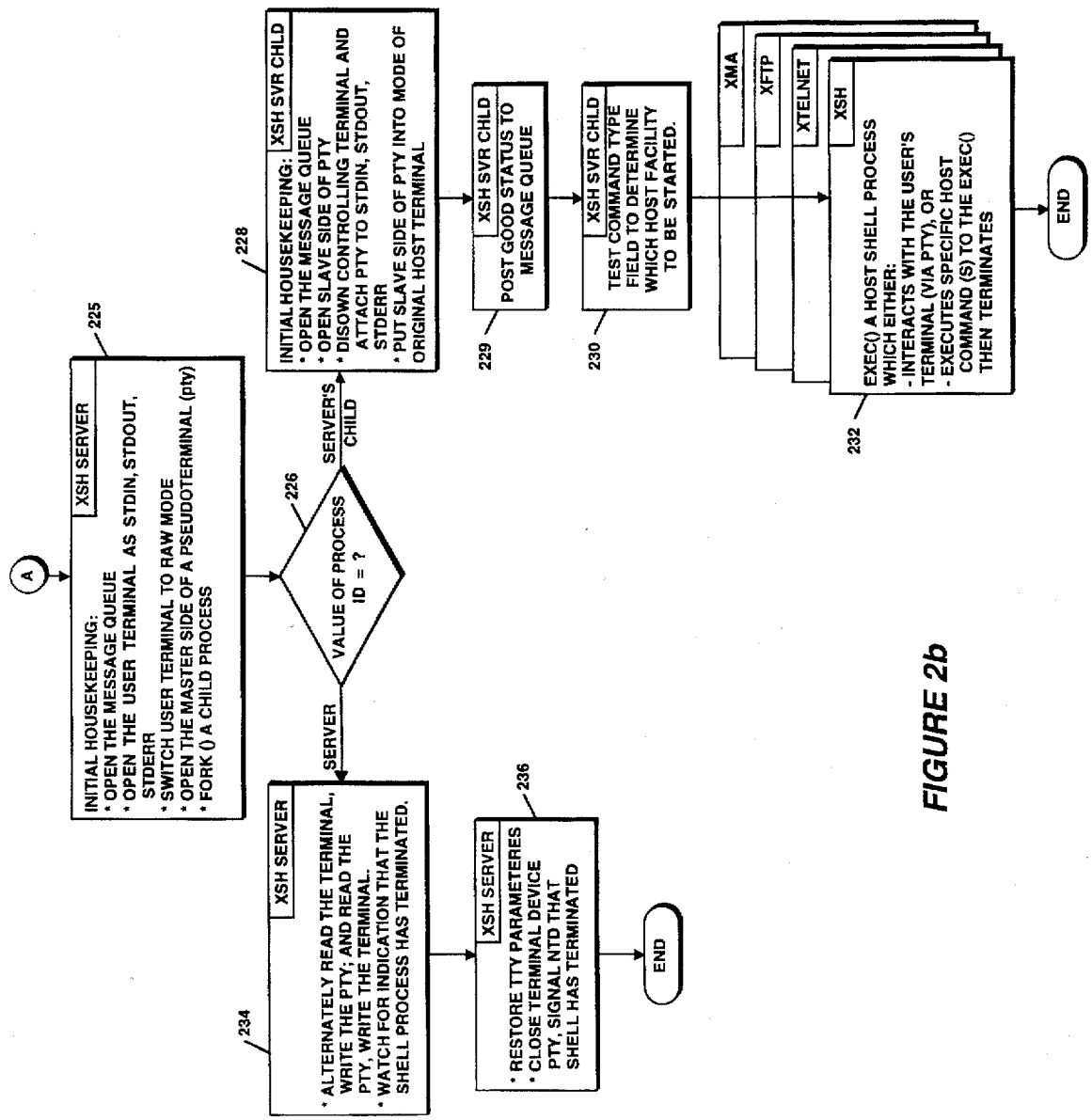

As indicated in FIG. 2b, the XSH server executed by the child process performs a sequence of initial housekeeping operations (block 225). These include opening the common message queue, opening the user terminal as STDIN, STDOUT and STDERR (original tty), storing off the original try configuration and switching the user terminal to "raw mode". Also, the XSH server child process opens the master side of a pseudo terminal (pty) pair which will serve as user terminal interface to the shell process in packet mode, and spawns a child process to handle terminal communications by issuing "fork" and "exec" system calls to kernel manager 70 (block 224).

Again, different sequences are performed by the XSH server parent and child processes as indicated in FIG. 2b. The XSH server child process performs a sequence of initial setup (housekeeping) operations. These include opening the common message queue, opening the slave side of the PTY pair, disowning the controlling terminal so that the next try opened becomes the controlling terminal, attaching the PTY to STDIN, STDOUT and STDERR and opening the slave side of the PTY pair redirecting I/O to and from this TTY and placing it in the mode of the original terminal (block 228). Also, the XSH server child process gets the device ID from the NTD server and sets that into the environment variable $TERM to condition the terminal properly at login.

Next, the XSH server child process posts a "good status" message with its PID and session number informing the XSH server parent process of having successfully completed its operations (block 229). The XSH server child process then issues an "exec" system call to kernel manager 70 which invokes either a host shell process or a specific host command(s) which interact with the user's terminal via the PTY pair.

That is, XSH server 940 is launched by the NTD server 94 with the following seven arguments:

t/r/f/m/p user id msg gid LDN ttype lnpid [host|command|man-topic|.

The first argument designates the command type wherein one of the letters t through p is included to designate the host facility to be invoked. The second argument corresponds to the user's login name as taken from the emulated system UCB data structure. The third argument is the name of the common XSH unique session oriented message queue. The fourth argument is the emulated system terminal logical driver name (LDN) obtained from the emulated system RCT structure. The fifth argument is the NTD server configured TTY type code obtained from the NTD driver ID field. The sixth argument is a mode indication as to whether the TTY is a direct connect or not. The seventh argument corresponds to the original command string sent with the emulated system user command (i.e., host, command, man-topic, etc.).

Figure 2C:
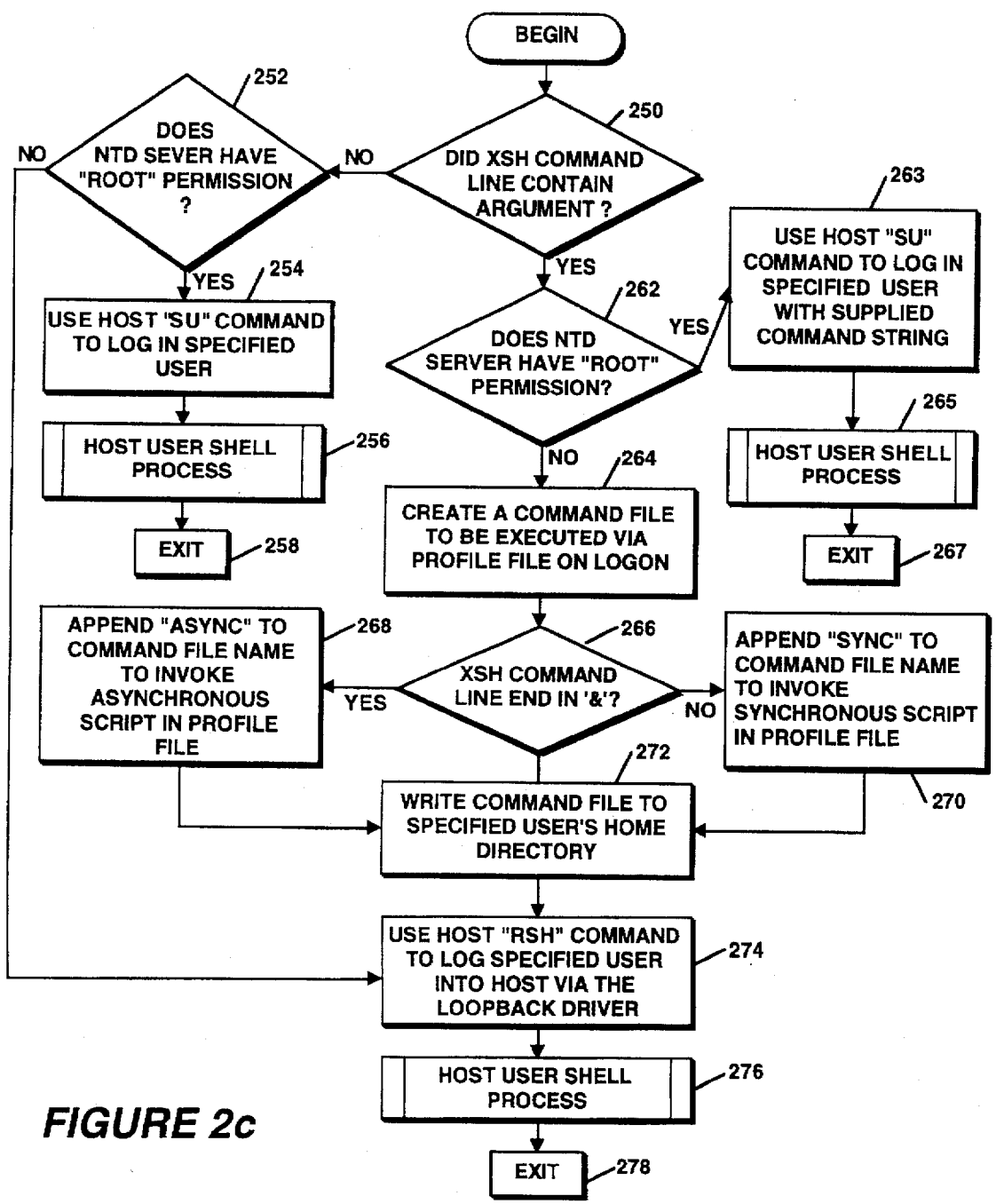

Based upon its first argument value, the XSH Server 940 launches the designated host facility such as "XSH". FIG. 2c illustrates the sequence of operations executed in an XSH command (i.e., designated as "r" in the command type field). These operations are similar for the other X-commands. The XSH server first determines if the XSH command contained an argument (which for the XSH command specifies that a single synchronous or asynchronous host command is to be executed in the host shell, while for the other X-commands, it will specify a host address, a manual page, etc.) The XSH server then determines whether the ES system was launched (or initiated) publicly or privately (i.e., by a highly privileged user (root or superuser) or by a less privileged user). This decision is made to determine how best to initiate the shell process. If the NTD server has "root" permissions, the XSH server process uses the host's "su" command to log in the specified user appended with the supplied XSH command argument string, if any (block 254). This is termed a public system launch. Thereafter, the user subshell process/ session as specified via the command string, or lack thereof, is executed with the same privileges as those of the specified user. When the XSH Server does not have "root" permissions, the XSH server process creates a command file containing the supplied XSH command argument string if any to be executed via a shellscript contained in the use's login startup file "profile" during logon (block 264). That is, specific shellscripts that are initially stored in each dual decor user's "profile" file via administrative configuration procedures which can modify the login environment (see Appendix C for examples of such scripts). Next, the XSH Server child process ascertains whether the session is synchronous or asynchronous (block 266). This is done by examining the user command string to see if it ended with an ampersand (&). If it did, then an "ASYNC" designator is appended to the name of the created command file (block 268). If it did not end in an ampersand, then a "SYNC" designation is appended to the created command file (block 270). Next, the XSH server child process writes the command file in the user's login ("$HOME") directory (block 272).

The above operations allow private launching of the user shell process via a host "rsh" command via the host's TCP/IP loopback dryer block 274. The user's ".rhosts" file in the "$HOME " directory was previously modified to include the following two entries appended as follows:

localhost em_admin loopback em_admin wherein em_admin is the registration name of the account that would normally launch the emulator process. This allows the translation to the host system to occur without requiring further user password authentication since it was previously established that the user is a trusted dual decor user. The loopback or localhost address causes the user shell process (block 276) to be connected via the host TCP/IP network facilities back to the local system.

From the above, it is seen how a host user shell process specified by the XSH command can be launched by emulated system users having different levels of privilege. That is, it can be launched on a public system via a host "su" command or on a private system by a host "rsh" command in a way which is completely transparent to the user using standard host system facilities.

The XSH server enters a route data loop for routing data between the original PTY/TTY and master side of new PTY pair. This involves alternately reading the terminal input data and writing it to the master PTY pair and then reading input data from the master PTY and writing it to the terminal. During the execution of the loop, it watches for an indication that the shell child process has terminated (e.g., processed an interrupt or quit signal) (block 232). When the indication is received, the XSH server flushes the output stream, doses the terminal driver and PTY pair, signals the NTD server 94 that the shell has terminated and then terminates its own operation (block 234).

APPENDICES

These Appendices include source listings which are subject to copyright protection. The copyright owner, Bull HN Information Systems Inc., has no objection to the facsimile reproduction by any one of the patent disclosure, as it appears in the Patent and Trademark Office patent files or records, but otherwise reserves all copyright rights in such listings whatsoever.

| | |
|---|---|
| APPENDIX A - Dual Decor Components | Pages A-1 - A-19 |
| APPENDIX B - Other Shell Commands | Pages B-1 - B-4 |
| APPENDIX C - Script Files | Page C-1 |

Page A-1

APPENDIX A
DUAL DECOR COMPONENTS
`********************************************************`
Code within the NTD Server (94) which activates the XSH Server (940)
`********************************************************`

```c
/*
 * Switch to Host procedure
 */
int
Switch_to_HOST(register PMCBPTR pmcbptr, struct IRB * irbptr, char *ldnptr)
{
    struct RB    *iorbptr;    /* pointer to IORB */
    struct TCB   *tcb;        /* pointer to TCB */
    struct UCB   *ucb;        /* pointer to UCB */
    struct LRB   *lrbptr;     /* ptr to LRB associated with IRB */
    char         *swc_path, userid[14], mypid[16];
    char         msgq_name[120], *session_name;
    char         *charptr, option[3], mymsgid[10], lmpid[10], ldn[13];
    int          stdinfd, stdoutfd, stderrfd, j, switchpid, err_msg;
    signed int   stat;
    int          msqid, rc, waitpid_ret;
    key_t        mymid;
    struct msgbuff *xshmbp, xshmb;

if (!(allowed("ddcor")))
    {
        pmcbptr->p_err = E_DVUN;
        return (0);
    }
    SRVR_RISC_ADDR(lrbptr, (struct LRB *), irbptr->i_rb, irbptr);
    lrbptr = (struct LRB *) ((char *) lrbptr - OFF_RB);
    iorbptr = pmcbptr->p_iorp;
    FD_CLR(mm->rfdes, &readfds);
    /* Get the Session's Instance Name */
    make_masterfilename();
    mymid = ftok(masterfilename, 1);
    sprintf(mymsgid, "%d", mymid);
    /* Set this XSH Instance's unique error message type code */
    err_msg = getpid();
    /* Parent Opens the Message Queue giving "Others" Write Permission */
    if ((msqid = msgget(mymid, (IPC_CREAT | 0666))) < 0)
    {
        syslog(LOG_ERR, "E789: XSH kiv Primary MsgQ Open failed (%m)");
        pmcbptr->p_err = E_CTUN;
        return (0);
    }
    xshmbp = &xshmb;
    /* spawn a child process to handle NTD output while in Host */
    switchpid = fork();
    if (switchpid == 0)
    {
                                        /* Child Process to execute switch command */
        RISC_ADDR(tcb, (struct TCB *), irbptr->i_tcb);
        tcb = (struct TCB *) (((char *) tcb) - OFF_TCB);
        RISC_ADDR(ucb, (struct UCB *), tcb->t_ucbp);
        charptr = (char *) ucb->ucb_pid;
    /* Child Opens the Message Queue */
        if ((msqid = msgget(mymid, 0)) < 0)
        {
```

Page A-2

```
        syslog(LOG_ERR, "E813: XSH kiv KC failed MQ Open: %m");
        exit(1);
    }
    for (j = 0; j < 12; j++, charptr++)
    {
        if (*charptr != ' ')
            userid[j] = (isupper(*charptr)) ? tolower(*charptr) : *charptr;
        else
            userid[j] = 0;
    }
    userid[12] = 0;
    for (j = 0; j < 12; j++, ldnptr++)
    {
        if (*ldnptr != ' ')
            ldn[j] = *ldnptr;
        else
            ldn[j] = 0;
    }
    ldn[12] = 0;
/* Check to see if User is Registered for Dual Decor */
    get_acl_qhead();
    if (!(get_user(irbptr, lrbptr, &userid)))
    {
       syslog(LOG_ERR,
            "E814: XSH kiv: %s Not Registered as Dual Decor User!",
            &userid);
       xshmbp = &xshmb;
       xshmbp->mtype = err_msg;
       xshmbp->mtext = E_DVUN;
       if ((rc = msgsnd(msqid, (struct msgbuff *) xshmbp, 4, 0)) < 0)
       {
            syslog(LOG_ERR,
                "E815: XSH kiv: DD Can't send to Error MQ, %m");
       }
       kill(getppid(), SIGUSR1);
       exit(0);
    }
    SRVR_RISC_ADDR(charptr, (char *), iorbptr->rb_adr, irbptr);
    syslog(LOG_INFO, "I348: XSH %s(at %s) to do >%s< cmd = %x",
        userid, &ldn, charptr, iorbptr->rb_hdr);
    swc_path = gethvx_xsh();
    for (j = 0; j <= FOPEN_MAX; j++)
    {
        stat = close(j);
    }
    stdinfd = open(mm->devname, O_RDONLY);
    stdoutfd = open(mm->devname, O_WRONLY);
    stderrfd = open(mm->devname, O_WRONLY);
    tcsetattr(stdinfd, TCSAFLUSH, &mm->origtty);
    sprintf(mypid, "%d", getppid());
    sprintf(ttytype, "%d", mm->ddid);
    if (mm->lrn == dualcon_lrn)
        sprintf(lmpid, "CONSOLE");
    else
    if (mm->hvxstat & DIRECT)
        sprintf(lmpid, "DIRECT");
```

Page A-3

```
                else
                        sprintf(lmpid, "%d", mm->pid);
        /* setup ES user ID and command if any to pass to switch process.
         * Note: The first 14 characters in the rb_adr are user ID and the
         * rest of the buffer is Host command line. */
                option[0] = (iorbptr->rb_hdr >> 8) & 0xff;
                option[1] = iorbptr->rb_hdr & 0xff;
                option[2] = 0;
                if (execlp(swc_path, "xsh_main", option, userid, &mymsgid, &ldn,
                                &ttytype, &lmpid, charptr, (char *) 0) == -1)
                {
                    syslog(LOG_ERR, "E816: XSH kiv: Error occurred in execlp %m");
                    xshmbp = &xshmb;
                    xshmbp->mtype = err_msg;
                    xshmbp->mtext = E_DEAD;
                    if ((rc = msgsnd(msqid, (struct msgbuff *) xshmbp, 4, 0)) < 0)
                    {
                            syslog(LOG_ERR, "E817: XSH kiv: EX Can't send to Error MQ, %m");
                    }
                    sleep(2);
                    kill(getppid(), SIGUSR1);
                    exit(0);
                }
        }
        else
        if (switchpid == -1)
        {
                fprintf(stderr, "NTD_XSH: Unable to fork the switch task\n");
                FD_SET(mm->rfdes, &readfds);
                do
                    stat = tcsetattr(mm->rfdes, TCSAFLUSH, &mm->newtty);
                while ((stat == -1) && (errno == EINTR));
                pmcbptr->p_err = E_DVUN;
        }
        else
        {                               /* Parent Process */
        /* Wait to Receive the four byte error message */
                do
                    rc = msgrcv(msqid, (struct msgbuf *) xshmbp, 4, err_msg, 0);
                while ((rc == -1) && (errno == EINTR));
                if (rc < 1)
                {
                    syslog(LOG_ERR, "E790: XSH kiv: failed MsgQ Recv: %m");
                    pmcbptr->p_err = E_CTUN;
                }
                else
                {
        /* Message sent, Place Returned Error Status in pmcb */
                    pmcbptr->p_err = (ushort) xshmbp->mtext;
                }
                return (0);
        }
}
```

Page A-4

```
***************************************************************
            Code of the XSH Server (940)
***************************************************************

/* Declare a Message Queue Structure for XSH Error reporting */
struct xshmsg
{
    long        mtype;
    ulong       mtext;
};

struct xshmsg   *xshmp = 0;
struct xshmsg   xshmsg;

#define STDIN 0
define STDOUT 1 static char     newline[] = "\r\n";
static char     tc6_msg[] = "\r\n\n Return to HVS. \r\n\n";
static char     forkerror[] = " Fork of shell failed: ";
static char     pty_error[] = "Cannot open master side\r\n";
static char     slave_error[] =
"Cannot determine device name of slave side\r\n";
static char     slave_error1[] = "Cannot open slave side\r\n";

pid_t       childpid;

define DATABUFFSZ 1024 int         shTtyFd;
struct winsize  shOrigWin;
int         pty;
int         tty;
char        *slave, conn_type[10];
int         noshell;
int         shell_rdy;
int         home_alone, log_main_pid;
/*
 * Log onto Host functionality
 *
 * xsh_main tlrlflmlp userid msgqid LDN ttype lmpid [host|command|man_topic]
 * Where:
 * t invokes telnet
 * r invokes rsh
 * f invokes ftp
 * m invokes man pages
 * p invokes tpad
 *
 */
void
main(argc, argv)
int     argc;
char    *argv[];
{
    int     i = 0;
```

Page A-5

```
        signed int      exit_stat, exit_stat1;
        signed int      stat;
        char            inbuff[5], termvar[90];
        char            namestring[40];
        pid_t           tc6pid;
        int             waitstat, waitpid_ret;
        void            child_clnp();
        struct termios  origtty, newtty;
        char            *errormsg;
        char            ftpbuf[1024], *uname;
        int             fd, msqid, rc;
        key_t           mymid;
        struct utmp     temput;
        int             status, ppid, did;

ppid = getppid();
/* open syslog for user */
    openlog(get_session_name(), LOG_PID, LOG_LOCAL0);
    setlogmask(LOG_MASK(LOG_ERR)
              | LOG_MASK(LOG_WARNING)
              | LOG_MASK(LOG_INFO)
              | LOG_MASK(LOG_NOTICE));
    mymid = atoi(argv[3]);
    xshmp = &xshmsg;
/* Parent Opens this XSH instance's Message Queue */
    if ((msqid = msgget(mymid, 0)) < 0)
    {
        syslog(LOG_ERR, "E792: XSH P failed MQ Open: %m");
        exit(1);
    }
    if (parse_options(argc, argv, msqid) != 0)
    {
        syslog(LOG_ERR, "E711: XSH No parse_options failed");
        post_error_sig(E_RQST, msqid, ppid);
    }
/* Save off old tty configuration and set driver to raw mode. */
    do
        i = tcgetattr(STDIN, &origtty);
    while ((i == -1) && (errno == EINTR));
    if (i == -1)
    {
        syslog(LOG_ERR, "E712: XSH tcgetattr failed %m");
        post_error_sig(E_DVDS, msqid, ppid);
    }
    newtty = origtty;
    newtty.c_iflag &= ~(-1);        /* raw mode */
    newtty.c_iflag |= PARMRK;
    newtty.c_iflag &= ~IXON;
    newtty.c_iflag &= ~IXOFF;
    newtty.c_oflag &= ~(OPOST);
    newtty.c_lflag &= ~(ISIG | ICANON | XCASE | ECHO);
    newtty.c_cc[VMIN] = 1;          /* 1 char */
    newtty.c_cc[VTIME] = 100 * 60; /* 6 minutes */
    do
        i = tcsetattr(STDIN, TCSAFLUSH, &newtty);
    while ((i == -1) && (errno == EINTR));
```

Page A-6

```c
    if (i == -1)
    {
            syslog(LOG_ERR, "E713: XSH tcsetattr failed %m");
            post_error_sig(E_DVDS, msqid, ppid);
    }
/* Setup STDIN for asynchronous reads. */
    do
            fd = open((ttyname(STDIN)), O_RDONLY);
    while ((fd == -1) && (errno == EINTR));
    if (fd < 0)
    {
            write_error(slave_error1, sizeof(slave_error1));
            syslog(LOG_ERR, "E714: XSH open stdin failed %m");
            post_error_sig(E_DVUN, msqid, ppid);
    }
    noshell = 0;
    sigset(SIGCLD, shell_gone);
    sigset(SIGDANGER, sigdanger2);
    dup2(fd, STDIN);
    if (getPtyTty(msqid, ppid) == -1)
    {
            syslog(LOG_ERR, "E715: XSH getPtyTty failed");
            post_error_sig(E_CTUN, msqid, ppid);
    }
    sigset(SIGUSR1, shell_ready);
    shell_rdy = home_alone = FALSE;
    strcpy(conn_type, argv[6]);
    if ((childpid = fork()) == 0)
    {
            close(0);
            close(1);
            close(2);
            close(pty);
/*
 * Become a process group leader, disown controlling terminal
 * so that next tty opened becomes controlling terminal.
 */
            setsid();
/* Child Opens the Message Queue */
            if ((msqid = msgget(mymid, 0)) < 0)
            {
                syslog(LOG_ERR, "E793: XSH C failed MQ Open: %m");
                exit(1);
            }
/* Open slave tty. Redirect i/o from/to this tty. */
            if ((tty = open(slave, O_RDWR)) < 0)
            {
                write_error(slave_error, sizeof(slave_error));
                syslog(LOG_ERR, "E716: XSH open slave failed %m");
                post_error_exit(E_DVUN, msqid, ppid);
            }
            dup2(tty, 1);
            dup2(tty, 2);
/* Place slave tty into original terminal state */
            do
                i = tcsetattr(tty, TCSAFLUSH, &origtty);
```

Page A-7

```c
        while ((i == -1) && (errno == EINTR));
        if (i == -1)
        {
          fprintf(stderr, "%s: tcsetattr() failed: %d\n", argv[0], errno);
          syslog(LOG_ERR, "E717: XSII tcsetattr failed %m");
          post_error_exit(E_DVDS, msqid, ppid);
        }
        (void) ioctl(tty, TIOCSWINSZ, &shOrigWin);
/* Get the device driver ID from NTDX to set $TERM */
        did = atoi(argv[5]);
        switch (did)
        {
        case 0x50:
        case 0x62:
           sprintf(termvar, "TERM=vip7800-vi");
           break;
        case 0x63:
           sprintf(termvar, "TERM=vip7201");
           break;
        case 0x64:
        case 0x67:
           sprintf(termvar, "TERM=vip7300");
           break;
        case 0x6c:
           sprintf(termvar, "TERM=dku7102");
           break;
        case 0xa0:
           sprintf(termvar, "TERM=hds2");
           break;
        case 0xa5:
           sprintf(termvar, "TERM=BQ3155");
           break;
        case 0xa6:
        case 0xa9:
           sprintf(termvar, "TERM=hds5-2");
           break;
        case 0xa7:
        case 0xa8:
           sprintf(termvar, "TERM=bds7-2");
           break;
        case 0xaa:
           sprintf(termvar, "TERM=bds7-1");
           break;
        case 0xab:
           sprintf(termvar, "TERM=hds5-1");
           break;
        case 0xc4:
           sprintf(termvar, "TERM=vt100");
           break;
        case 0xc7:
           sprintf(termvar, "TERM=vt320");
           break;
/* Default all Class Profile, Printer & other Settings to "dumb" */
        default:
           sprintf(termvar, "TERM=dumb");
        }
```

Page A-8

```
putenv(termvar);
for (i = 0; i < NSIG; i++) /* Set all signals to default values. */
   sigset(i, SIG_DFL);
sigset(SIGDANGER, sigdanger2);
xshmp = &xshmsg;
xshmp->mtype = ppid;
xshmp->mtext = E_GOOD;
kill(getppid(), SIGUSR1);
syslog(LOG_INFO, "I649: XSH Shell enabled");
switch (*argv[1])   /* Test for XSH Sub-Command Type */
{
case 'p':           /* HVS XTPAD */
  strcpy(ftpbuf, "/usr/bin/tpad ");
  if ((argc > 7) && (*argv[7] != '\0'))
  {
        strcat(ftpbuf, argv[7]);
        strcat(ftpbuf, " ;sleep 2");
  }
  if (!getuid())    /* Use su if root started HVX */
  {
        post_good_guy(msqid, xshmp);
        execlp("/usr/bin/su", "su", "-", argv[2], "-c", ftpbuf, 0);
  }
  else
  {
        createfile("sync", argv[2], ftpbuf, msqid, ppid);
        post_good_guy(msqid, xshmp);
        execlp("rsh", "loopback", "-l", argv[2], NULL);
  }
  break;
case 'm':           /* HVS XMAN */
  strcpy(ftpbuf, "/usr/bin/man ");
  if ((argc > 7) && (*argv[7] != '\0'))
  {
        strcat(ftpbuf, argv[7]);
        strcat(ftpbuf, " ;sleep 2");
  }
  else
        post_error_exit(E_ARG, msqid, ppid);
  if (!getuid())    /* Use su if root started HVX */
  {
        post_good_guy(msqid, xshmp);
        execlp("/usr/bin/su", "su", "-", argv[2], "-c", ftpbuf, 0);
  }
  else
  {
        createfile("sync", argv[2], ftpbuf, msqid, ppid);
        post_good_guy(msqid, xshmp);
        execlp("rsh", "loopback", "-l", argv[2], NULL);
  }
  break;
case 't':           /* HVS XTELNET */
  sprintf(namestring, "HVS telnet for %s", argv[2]);
  post_good_guy(msqid, xshmp);
  if (argc > 7 && *argv[7] != '\0')
  {
```

Page A-9

```c
                execlp("telnet", namestring, argv[7], NULL);
        }
        else
        {
                execlp("telnet", namestring, NULL);
        }
        break;
case 'f':              /* HVS XFTP */
        sprintf(namestring, "HVS ftp for %s", argv[2]);
        if (argc > 7 && *argv[7] != '\0')
        {                       /* Hostname for connect is given */
                sprintf(ftpbuf, "ftp %s", argv[7]);
        }
        else
        {                       /* No Hostname given, call ftp command
                                 * level */
                sprintf(ftpbuf, "ftp");
        }
        if (!getuid())    /* Use su if root started HVX */
        {
                post_good_guy(msqid, xshmp);
                execlp("/usr/bin/su", "su", "-", argv[2], "-c", ftpbuf, 0);
        }
        else
        {
                createfile("sync", argv[2], ftpbuf, msqid, ppid);
                post_good_guy(msqid, xshmp);
                execlp("rsh", "loopback", "-l", argv[2], NULL);
        }
        break;
case 'r':              /* XSH Remote Shell */
        if (argc > 7 && *argv[7] != '\0')
        {                       /* Execute Single Command Line */
                char    *lastptr;
                lastptr = argv[7] + strlen(argv[7]) - 1;
                if (*lastptr == '&')
                {               /* Asynchronous Command Line Operation */
                        if (!getuid()) /* Use su if root started HVX */
                        {
                                post_good_guy(msqid, xshmp);
                                execlp("/usr/bin/su", "su", "-", argv[2], "-c",
                                    "nohup", argv[7], 0);
                        }
                        else
                        {
                                argv[7][(strlen(argv[7]) - 1)] = 0;
                                createfile("async", argv[2], argv[7], msqid, ppid);
                                post_good_guy(msqid, xshmp);
                                execlp("rsh", "loopback", "-l", argv[2], NULL);
                        }
                }               /* asynch */
                else
                {               /* Synchronous Command Line Operation */
                        if (!getuid()) /* Use su if root started HVX */
                        {
/*
```

Page A-10

```
 * P1348: Need to keep this child process alive longer
 *        in order to not truncate the XSH command line.
 *        To fix rsh version add "sleep 3" to the ASYNC
 *        shellscript in the .profile (SMIT).
 */
                        post_good_guy(msqid, xshmp);
                        strcpy(ftpbuf, argv[7]);
                        strcat(ftpbuf, " ;sleep 2");
                        execlp("/usr/bin/su", "su", "-", argv[2], "-c",
                            ftpbuf, 0);
                }
                else
                {
                        createfile("sync", argv[2], argv[7], msqid, ppid);
                        post_good_guy(msqid, xshmp);
                        execlp("rsh", "loopback", "-l", argv[2], NULL);
                }
            }                   /* synch */
        }                       /* single-command line */
        else
        {                       /* Just Log User In */
            post_good_guy(msqid, xshmp);
            if (!getuid())      /* Use su if root started HVX */
            {
                execlp("/usr/bin/su", "su", "-", argv[2], 0);
            }
            else
            {
                execlp("rsh", "loopback", "-l", argv[2], NULL);
            }
        }
        break;
    default:                    /* Non Supported Sub-Command */
        syslog(LOG_ERR, "E718: XSH Unsupported command type Sent");
        post_error_exit(E_MODE, msqid, ppid);
    }                           /* subcommand type switch */
    exit(0);
}                               /* end of child */
else
if (childpid == -1)
{
    write_error(forkerror, sizeof(forkerror));
    write_message(tc6_msg, sizeof(tc6_msg));
    syslog(LOG_ERR, "E719: XSH Can't fork Child %m");
}
else
{                               /* This is the parent. */
/* Update /etc/utmp file entry to this new user, pty, etc. */
    strncpy(temput.ut_user, argv[2], sizeof(temput.ut_user));
    strcpy(temput.ut_id, slave + 5);
    strcpy(temput.ut_line, slave + 5);
    temput.ut_pid = (ushort) childpid;
    temput.ut_type = USER_PROCESS;
    temput.ut_exit.e_termination = 0;
    temput.ut_exit.e_exit = 0;
    temput.ut_time = time(NULL);
```

Page A-11

```
        strcpy(temput.ut_host, "HVX ");
        strncat(temput.ut_host, argv[4], 12);
        pututline(&temput);
        endutent();
        while ((shell_rdy == FALSE) && (noshell == FALSE))
        {
           sleep(1);
        }
        routeData(msqid);
        sigset(SIGALRM, SIG_IGN);
        sigset(SIGUSR2, hangup);
        sigset(SIGCLD, SIG_DFL);
        i = 0;
        do                          /* insure no defunct shell process. */
        {
           i++;
           waitpid_ret = waitpid(childpid, &waitstat, 0);
        }
        while ((waitpid_ret != childpid) && (i < 20));
    }                               /* parent */
    do
        i = tcsetattr(STDIN, TCSAFLUSH, &origtty);
    while ((i == -1) && (errno == EINTR));
    if (i == -1)
    {
        fprintf(stderr, "%s: tcsetattr() failed: %d\n", argv[0], errno);
        syslog(LOG_ERR, "E720: XSH tcsetattr Flush failed %m");
    }
/* Change State of /etc/utmp file entry for termination */
    temput.ut_type = DEAD_PROCESS;
    temput.ut_exit.e_termination = 0;
    temput.ut_exit.e_exit = 0;
    temput.ut_time = time(NULL);
    pututline(&temput);
    endutent();
    if (home_alone)
    {
        if (strcmp(conn_type, "DIRECT") != 0)
        {                           /* If DIRECT, then its a Directly
                                     * Connected TTY */
            log_main_pid = atoi(argv[6]);
            kill(log_main_pid, SIGKILL);
        }
    }
    else
    {
        kill(ppid, SIGUSR1);
    }
    exit(0);
}                                   /* main */

/***************
 * parse_options *
 ***************/
int
parse_options(argc, argv, msqid, ppid)
```

Page A-12

```
int         argc, msqid, ppid;
char        **argv;
{
   int         o;
   int         fcount = 0;
   extern char   *optarg;

while ((o = getopt(argc, argv, "V")) != -1)
   {
         switch (o)
         {
         case 'V':
            hvx_verV(argv[0]);
            exit(0);
            break;
         case 0x3f:
            return (0);
         default:
            post_error_sig(E_MODE, msqid, ppid);
         }                         /* switch */
   }                               /* while */
   if (argc < 5)
   {
         syslog(LOG_ERR, "E491: HVX_XSH parse arguments failure");
         post_error_sig(E_RQST, msqid, ppid);
   }
   else
         return (0);
}                                  /* parse_options */

/*************
 * createfile * Create command file in user's Home Directory
 *************/
void
createfile(char *mode, char *user, char *cmdline, int msqid, int ppid)
{
   char        filenm[200];
   int         resid, old_mask, fd, retry;
   struct passwd   *pwent;

if ((pwent = getpwnam(user)) == (struct passwd *) 0)
   {
         perror(user);
         syslog(LOG_ERR, "E722: XSH Createfile can't getpwname %m");
         post_error_exit(E_ARG, msqid, ppid);
   }
   sprintf(filenm, "%s/XSH.%s", pwent->pw_dir, mode);
   old_mask = umask(0);
   retry = 0;
   while ((fd = open(filenm, O_CREAT | O_EXCL | O_RDWR, 0755)) == -1)
   {
         if ((errno == EEXIST) && (retry++ < 5))
         {
            sleep(4);
            continue;
         }
```

Page A-13

```
        else
        {
           perror(filenm);
           syslog(LOG_ERR, "E723: XSH Can't open %s file %m", filenm);
           post_error_exit(E_DVUN, msqid, ppid);
        }
   }                                    /* while ... */
   old_mask = umask(old_mask);
   if ((resid = write(fd, cmdline, strlen(cmdline))) == -1)
   {
        perror(filenm);
        syslog(LOG_ERR, "E724: XSH Can't write %s file %m", filenm);
        post_error_exit(E_DVUN, msqid, ppid);
   }
   if (close(fd) == -1)
   {
        perror(filenm);
        syslog(LOG_ERR, "E725: XSH Can't close %s file %m", filenm);
        post_error_exit(E_DVUN, msqid, ppid);
   }
}                                       /* createfile */ void
new_line(howmany)
int        howmany;
{
   int        stat;

for (; howmany > 0; howmany--)
   {
        do
            stat = write(1, newline, sizeof(newline));
        while ((stat == -1) && (errno == EINTR));
   }
}                                       /* new_line */ void
write_message(message, length)
char       *message;
int        length;
{
   int        stat;

do
        stat = write(1, message, length);
   while ((stat == -1) && (errno == EINTR));
}                                       /* write_message */ void
write_error(message, length)
char       *message;
int        length;
{
   char       *errormsg;
   int        stat;
   void       new_line();
```

Page A-14

```
        errormsg = strerror(errno);
        new_line(2);
        do
                stat = write(2, message, length);
        while ((stat == -1) && (errno == EINTR));
        while (*errormsg != '\0')
        {
                do
                    stat = write(2, errormsg++, 1);
                while ((stat == -1) && (errno == EINTR));
        }
        new_line(2);
}                               /* write_error */

/*********
 * hangup *      insure that child shell process is killed
 *********/
void
hangup()
{
   kill(childpid, SIGUSR2);
}                               /* hangup */

/************
 * getPtyTty *   creates master/slave Pty pair for use in subshell fork
 ************/
int
getPtyTty(msqid, ppid)
int        msqid, ppid;
{
   int          pkt;

/* Open master "controller" pty. */
   if ((pty = open("/dev/ptc", O_RDWR)) < 0)
     {
         write_error(pty_error, sizeof(pty_error));
         syslog(LOG_ERR, "E726: XSH Can't open pty %m");
         post_error_sig(E_DVUN, msqid, ppid);
     }
   pkt = 1;
   ioctl(pty, TIOCPKT, &pkt);
   ioctl(STDIN, TIOCGWINSZ, &shOrigWin);
/* Get name of slave side device */
   if ((slave = (char *) ttyname(pty)) == NULL)
     {
         write_error(slave_error, sizeof(slave_error));
         syslog(LOG_ERR, "E727: XSH Can't ttyname slave tty %m");
         post_error_sig(E_DVDS, msqid, ppid);
     }
   return (0);
}                               /* getPtyTty */

/************
 * routeData *   passes data between pty and terminal
 ************/
```

Page A-15

```
routeData(msqid)
int       msqid;
{
   fd_set    readfds, excfds, maskfds;
   char      buff[DATABUFFSZ];
   int       len;
   int       rc, rc2;
   int       i;

/* Place input's into select mask */
   FD_ZERO(&maskfds);
   FD_SET(STDIN, &maskfds);
   FD_SET(pty, &maskfds);
   sigset(SIGALRM, ck_ppid);
   alarm(5);
   for (;;)
   {
/* Set up bit masks for reading and exceptions and do select. */
        readfds = excfds = maskfds;
        rc = select(32, (void *) &readfds, NULL, (void *) &excfds, NULL);
        if (noshell)
           {                          /* Stay in the Loop until Child Expires */
           do
                rc2 = fcntl(pty, F_SETFL, O_NONBLOCK);
           while ((rc2 == -1) && (errno == EINTR));
           if (rc2 == -1)
                return (0);
           for (;;)
           {
                len = read(pty, buff, DATABUFFSZ);
                if ((len == -1) && (errno != EINTR))
                   return (0);
/* Single NULL returned */
                else
                if ((len == 0) || ((len == 1) && (buff[0] == 0x0)))
                   return (0);
                else
                {
                   switch (buff[0])
                   {
                   case TIOCPKT_FLUSHWRITE:
                   case TIOCPKT_FLUSHREAD | TIOCPKT_FLUSHWRITE:
/*
 * Flush stdout and scrglipt fd since slave has
 * processed an interrupt or quit signal.
 */
                        ioctl(STDIN, TCFLSH, 1);
                        rc--;
                        break;
                   case TIOCPKT_DATA:        /* Actual data follows cntrl byte. */
                        len--;
                        if (do_write(STDOUT, &buff[1], len) < 0)
                           syslog(LOG_ERR,
                           "E887: XSH Unable to write to standard out %m");
                        rc--;
                        break;
```

Page A-16

```
                }                       /* buff[0] switch */
            }                           /* end else */
        }                               /* end for */
        return;
    }
    while (rc > 0)
    {
/*
* If there is input from terminal
* then read it and write it down pty master.
*/
        if ((FD_ISSET(STDIN, &readfds)) || (FD_ISSET(STDIN, &excfds)))
        {
            rc--;
            if ((len = read(STDIN, buff, DATABUFFSZ)) < 1)
            {
                if ((errno == EINTR) || (len == 0))
                {
                    rc = 0;
                    continue;
                }
                else
                {
                    syslog(LOG_ERR, "E728: XSH Can't read STDIN %m");
                    post_error_sig(E_DVUN, msqid, getppid());
                }
            }
            else
            {
                if (do_write(pty, buff, len) < 0)
                    syslog(LOG_ERR,
                        "E888: XSH Unable to write to pty %m");
            }
        }                               /* input from terminal */
/*
* Otherwise if there is input from master pty then read it,
* check for flushes, and write any data to terminal.
*/
        if ((FD_ISSET(pty, &readfds)) || (FD_ISSET(pty, &excfds)))
        {
            rc--;
            len = read(pty, buff, DATABUFFSZ);
            if ((len == -1) && (errno == EINTR))
                continue;
            if ((len == -1) && (errno != EINTR))
            {
                syslog(LOG_INFO, "I624: XSH Cannot read pty %m");
                return (0);
            }
            switch (buff[0])
            {
            case TIOCPKT_FLUSHWRITE:
            case TIOCPKT_FLUSHREAD | TIOCPKT_FLUSHWRITE:
/*
* Flush stdout and scrglipt fd since slave has
* processed an interrupt or quit signal.
```

Page A-17

```
*/
                        ioctl(STDIN, TCFLSH, 1);
                        break;
                case TIOCPKT_DATA:/* Actual data follows control byte. */
                        len--;
                        if (do_write(STDOUT, &buff[1], len) < 0)
                                syslog(LOG_ERR,
                                    "E890: XSH Unable to write to standard out %m");
                        break;
                }                       /* buff[0] switch */
            }                           /* if readfds or excfds */
        }                               /* while */
    }                                   /* for ever */
}                                       /* routeData */

/*************
 * shell_gone *    Tell route data that shell is gone
 *************/
/*
 * Read of 0 from pty should do this but there seems to be some BOSX problem.
 * This function may not be needed in the future.
 */
void
shell_gone(int sig)
{
   noshell = 1;
}                               /* shell_gone */

/*****************
 * shell_ready *    The shell is ready to go
 *****************/
/*
 * This is needed to insure that the shell is there when routedata is called.
 */
void
shell_ready(int sig)
{
   shell_rdy = 1;
}                               /* shell_ready */

/***************
 * ck_ppid     *
 ***************/
void
ck_ppid(int sig)
{
   pid_t        p_pid;          /* parent pid */ if ((p_pid = getppid()) != 1)
   {
        alarm(5);               /* don't do anything */
   }
   else
   {
        home_alone++;
        syslog(LOG_ERR, "E1000: XSH My Parent's gone. My Child: %d", childpid);
```

Page A-18

```c
        fprintf(stderr, "XSH: HVS is going down!");
        if (strcmp(conn_type, "CONSOLE") == 0)
        {                       /* If CONSOLE, then exit immediately */
           fprintf(stderr, "\n\rXSH: This is the console device. XSH terminating.\r\n");
           syslog(LOG_INFO, "I645: XSH On %s, Goodbye!", conn_type);
           exit(0);
        }
        else
        {
           fprintf(stderr, " This shell session will remain.\r\n");
        }
    }
}

/***************
 * do_write    *
 ***************/
int
do_write(int fd, char *buffptr, int size)
{
    char        *n_ptr;
    int         n_size, n_len;
    int         rc;

n_ptr = buffptr;
    n_size = size;
    while (n_size > 0)
    {
          do
             n_len = write(fd, n_ptr, n_size);
          while ((n_len == -1) && (errno == EINTR));
          if (n_len < 1)
             return (-1);
          n_ptr += n_len;
          n_size -= n_len;
    }
    return (0);
}                               /* end do_write */

/***************
 * post_good_guy *
 ****************/
void
post_good_guy(msqid, xshmp)
int         msqid;
struct xshmsg  *xshmp;
{
   if ((msgsnd(msqid, (struct xshmsg *) xshmp, 4, 0)) < 0)
   {
         syslog(LOG_ERR, "E794: XSH gg Can't send to Error MQ, %m");
         exit(0);
   }
}                               /* post_good_guy */

/******************
 * post_error_exit * Exit after posting error
```

Page A-19

```
*****************/
void
post_error_exit(err_code, msqid, ppid)
ushort    err_code;
int       msqid, ppid;
{
   struct xshmsg   xshmsg, *xshmp;
   int             rc;

fflush(stderr);         /* Make sure error_out sent to terminal */
   sleep(1);               /* Don't go away before output printed. */
   xshmp = &xshmsg;
   xshmp->mtype = ppid;
   xshmp->mtext = err_code;
   if ((rc = msgsnd(msqid, (struct xshmsg *) xshmp, 4, 0)) < 0)
   {
         syslog(LOG_ERR, "E795: XSH pex Can't send to Error MQ, %m");
   }
   exit(0);
}                          /* post_error_exit */

/****************
* post_error_sig * Signal NTD to take tty back after posting error
*****************/
void
post_error_sig(err_code, msqid, ppid)
ushort    err_code;
int       msqid, ppid;
{
   struct xshmsg   xshmsg, *xshmp;
   int             rc;

fflush(stderr);         /* Make sure error_out sent to terminal */
   sleep(1);               /* Don't go away before output printed. */
   xshmp = &xshmsg;
   xshmp->mtype = ppid;
   xshmp->mtext = err_code;
   if ((rc = msgsnd(msqid, (struct xshmsg *) xshmp, 4, 0)) < 0)
   {
         syslog(LOG_ERR, "E796: XSH pes Can't send to Error MQ, %m");
   }
   kill(ppid, SIGUSR1);
   exit(0);
}                          /* post_error_sig */

/************
* sigdanger2 * system crash imminent; free up some page space
*            * signal rec'd by child process
*************/
void
sigdanger2()
{
   syslog(LOG_ERR, "E797: XSH Exiting on SIGDANGER");
   exit(0);
}                          /* sigdanger2 */
```

'age B-1

APPENDIX B

OTHER SHELL COMMANDS

1. XMAN

The XMAN command allows viewing of the host manpages from the emulated system. (It can be used only by users registered for Dual Decor.)

Format:
    XMAN command_or_directive_name

Arguments:
    command_or_directive_name
    The name of any host command or any system directive or command.

Function:
    The descriptions of all host commands and directives are available on-line in the form of host manual (man) pages. The XMAN command can be used to read these man pages, as well as any host man page, from the emulated system environment.

XMAN is case sensitive for all system commands and directives. All directives and emulated system commands must be entered in upper case. All host operating system commands must be entered in lower case, except the HVS command.

Page B-2

2. XTELNET

The XTELNET command runs the host telnet command from the emulated system mode of the system. (Can be used only by users registered for Dual Decor.)

Format:

XTELNET [hostname]

Arguments:
hostname
> The remote host wanted to connect to.

Function:

Telnet is a host utility that allows connection to a remote system. Registration on the remote system allows log in and the ability to run any commands or applications that login permissions allow.

XTELNET uses the telnet facility of the host system. When XTELNET is used, telnetting from the host system to the remote system occurs.

Remote users cannot telnet to the emulated system mode of a system. They can telnet to the host system if they have login privileges.

Page B-3

3. XTPAD

The XTPAD command runs the host tpad command from the emulated system mode of the system. (Can be used only by users registered for Dual Decor.)

Format:
XTPAD [ctl_args]

Arguments:
Use any or none of the following arguments:

Note: Surround each argument with double quotes to protect the case of the argument and any parameters.

-t

Reserved for debugging operations.

-n

Inhibits access to the host .padrc file.

-SNSEL

Specifies a particular Network Selector declared in the host/etc/hpadd.conf file.

-!

Inhibits execution of specific interactive TPAD commands.

-dn1,n2

Reserved for debugging operations.

-f cfile

Specifies a host script file to be executed during the login phase.

-pprofil

Requests loading of a particular profile specified by its number as declared in the host/etc/PROFPAD file.

Page B-4

-8

Data is 8-bit, not 7-bit.

address

Specifies the called address.

Function:
XTPAD is the system equivalent of the emulated system TPAD (Terminal Packet Assembler/Disassembler), which gives a terminal user access to an X.25 network. Using a TPAD command, a user may connect to a remote HPAD (Host Packet Assembler/Disassembler) to log in to another system on the X.25 network.

Page C-1

APPENDIX C
SCRIPT FILES

1. SYNC SCRIPT FILE

```
if [ -f $HOME/XSH.sync ]
then
    trap : 1 2 3
    mv $HOME/XSH.sync $HOME/XSH.sync.$$
    $HOME/XSH.sync.$$
    rm -f $HOME/XSH.sync.$$
    exit 0
```

2. ASYNC SCRIPT FILE

```
if [ -f $HOME/XSH.async ]
then
    trap : 1 2 3
    mv $HOME/XSH.async $HOME/XSH.async.$$
    nohup $HOME/XSH.async.$$ &
    sleep 4
    rm -f $HOME/XSH.async.$$
    exit 0
    exit 0
```

It will be apparent to those skilled in the art that many changes may be made to the preferred embodiment of the present invention.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A host system having a memory organized into shared and host memory areas and a hardware platform including a plurality of input/output drivers operatively connected for executing host system instructions and for emulating the execution of emulated system instructions by an emulator running as an application process on said host system, said plurality of input/output drivers including terminal drivers, said emulator including a number of emulated system executive service components operating in said shared memory area comprising a command handler unit and an interpreter, an emulator monitor call unit (EMCU) and server facilities operating in said host memory area, said host system further including operating system facilities for providing a number of services for host programs, said operating system facilities being coupled to said plurality of input/output drivers and to said EMCU, said host system further including a terminal based facility for invoking host system facilities by a number of terminal based dual decor commands, said terminal based facility comprising:

a shared terminal based command handler means included within said command handler unit, said command handler means responsive to any one of said number of dual decor commands generating a special monitor call to said EMCU for causing a request input/output operation to be issued to said server facilities;

a user table (USTBL) mechanism located in said host memory area, said USTBL mechanism having a number of locations for storing unique user description entries generated by said EMCU for emulated system users whose identities were previously validated during login; and, said server facilities including network terminal driver (NTD) server means operatively connected to said terminal drivers, said NTD server means including user security validation means, said security validation means in response to input/output request generated by said terminal based command handler means in response to one of said number of terminal based dual decor commands, performing a validation operation on said emulated system user identity by accessing said user table mechanism entry associated with said user requesting access to ascertain that said command was issued by a trusted user and would not compromise host system security.

2. The host system of claim 1 wherein each unique user description entry includes emulated system descriptive information associated with the user by said executive service components which is not modifiable by the user.

3. The host system of claim 2 wherein said emulated system user descriptive information used to perform said validation operation includes a first portion containing user-id information and second and third portions containing addresses of predetermined data structures used by the executive service components to uniquely identify the user.

4. The host system of claim 3 wherein said NTD server means performs said validation operation by comparing the portions of said emulated system user descriptive information previously stored in said user table mechanism as an entry for the user with corresponding portions of emulated system user descriptive information obtained from said emulated memory area obtained by said NTD server means which is associated with a current user issuing said command.

5. The host system of claim 4 wherein said NTD server means upon determining that there is no identical comparison indicating that the current user is untrustworthy, signals the occurrence of a user security violation and does not initiate a series of operations for enabling execution of the command.

6. The host system of claim 5 wherein said NTD server means upon determining that there is an identical comparison identifying no change in user personality confirming that the current user is trustworthy, initiates a series of operations for enabling execution of the command.

7. The host system of claim 1 wherein each of said terminal based dual decor commands is a new command added to a set of commands utilized by said emulated system which can be executed either synchronously or asynchronously.

* * * * *